US011809856B2

(12) United States Patent
Wu et al.

(10) Patent No.: US 11,809,856 B2
(45) Date of Patent: Nov. 7, 2023

(54) OVER THE AIR MODEM FIRMWARE UPGRADE BASED ON MESH NETWORK

(71) Applicant: HONEYWELL INTERNATIONAL INC., Morris Plains, NJ (US)

(72) Inventors: Wei Wu, Morris Plains, NJ (US); Feng Su, Morris Plains, NJ (US); Xiaozhong Zhang, Morris Plains, NJ (US); Zhiyu Wang, Morris Plains, NJ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 738 days.

(21) Appl. No.: 16/332,624

(22) PCT Filed: Sep. 14, 2016

(86) PCT No.: PCT/CN2016/098970
§ 371 (c)(1),
(2) Date: Mar. 12, 2019

(87) PCT Pub. No.: WO2018/049580
PCT Pub. Date: Mar. 22, 2018

(65) Prior Publication Data
US 2021/0279051 A1    Sep. 9, 2021

(51) Int. Cl.
*G06F 8/654*    (2018.01)
*H04W 76/19*    (2018.01)
(Continued)

(52) U.S. Cl.
CPC .............. *G06F 8/654* (2018.02); *G06F 8/656* (2018.02); *H04L 67/34* (2013.01); *H04Q 9/00* (2013.01);
(Continued)

(58) Field of Classification Search
CPC ........ G06F 8/654; G06F 8/656; H04W 76/19; H04L 67/34; H04Q 9/00; H04Q 2209/40
See application file for complete search history.

(56) References Cited

U.S. PATENT DOCUMENTS

| 2006/0069825 A1* | 3/2006 | Hodder .............. G06K 15/1801 710/72 |
| 2012/0194334 A1* | 8/2012 | Worthington ........ G08B 21/043 340/521 |

(Continued)

FOREIGN PATENT DOCUMENTS

| CN | 101616018 | 12/2009 |
| CN | 202486118 U | 10/2012 |

(Continued)

OTHER PUBLICATIONS

International Search Report and Written Opinion for International Application No. PCT/CN2016/098970 dated Jun. 7, 2017.
(Continued)

*Primary Examiner* — Amine Benlagsir
(74) *Attorney, Agent, or Firm* — Alston & Bird LLP

(57) ABSTRACT

Systems and methods for upgrading the firmware of a wireless communication device (202). A wireless communication device (202) may comprise a first processor (204) and a first memory (206) configured to receive monitored data from one or more sensors (210), and wirelessly communicate the received monitored data. The device may comprise a modem (220) comprising a second processor (224) and a second memory (226) configured to wirelessly send an identifier for the current firmware stored in the second memory (226); when a firmware upgrade is available, receive an upgrade for the firmware stored in the second memory (226); upgrade the firmware stored in the second memory (226), wherein upgrading the firmware comprises temporarily interrupting wireless communication
(Continued)

to and from the wireless communication device (202); reestablish wireless communication to and from the wireless communication device (202); and forward any monitored data received by the first processor (204) and the first memory (206) during the temporary interruption.

7 Claims, 2 Drawing Sheets

(51) Int. Cl.
*H04L 67/00* (2022.01)
*H04Q 9/00* (2006.01)
*G06F 8/656* (2018.01)

(52) U.S. Cl.
CPC ........ H04W 76/19 (2018.02); *H04Q 2209/40* (2013.01)

(56) References Cited

U.S. PATENT DOCUMENTS

| | | | | |
|---|---|---|---|---|
| 2013/0283256 | A1* | 10/2013 | Proud | G06Q 20/384 717/172 |
| 2014/0036702 | A1* | 2/2014 | Van Wyk | H04L 43/0823 370/252 |
| 2014/0119280 | A1* | 5/2014 | Azizi | H04W 74/0816 370/328 |
| 2016/0072891 | A1* | 3/2016 | Joshi | G06Q 30/0631 370/254 |
| 2016/0211985 | A1* | 7/2016 | Castillo | F24F 11/62 |
| 2017/0249135 | A1* | 8/2017 | Gandhi | H04L 67/14 |

FOREIGN PATENT DOCUMENTS

| | | |
|---|---|---|
| CN | 102855151 | 1/2013 |
| CN | 102917340 A | 2/2013 |
| CN | 103729210 A | 4/2014 |
| CN | 102546804 B * | 6/2014 |
| CN | 104915237 | 9/2015 |
| CN | 105094913 | 11/2015 |
| KR | 2014-0113004 A | 9/2014 |
| WO | 2013/114317 | 8/2013 |

OTHER PUBLICATIONS

CN Office Action dated Mar. 7, 2022 for CN Application No. 201680089175.
English Translation of CN Office Action dated Mar. 7, 2022 for CN Application No. 201680089175.
CN Office Action dated Jun. 22, 2022 for CN Application No. 201680089175.
CN Office Action dated Oct. 14, 2022 for CN Application No. 201680089175.
English Translation of CN Office Action dated Oct. 14, 2022 for CN Application No. 201680089175.
CN Notice of Allowance dated Jan. 5, 2023 for CN Application No. 201680089175.
English translation of CN Notice of Allowance dated Jan. 5, 2023 for CN Application No. 201680089175.
Office Action issued in Chinese Application No. 201680089175.1 dated Sep. 15, 2021, 23 pages.

* cited by examiner

OVER THE AIR MODEM FIRMWARE UPGRADE BASED ON MESH NETWORK

CROSS-REFERENCE TO RELAYED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In certain work areas and facilities, workers may carry Personal Protective Equipment (PPE) devices, such as gas detectors, with them while they are working. These gas detectors may be operable to gather data on the environment and location of the worker. PPE devices may be capable of communicating with a wireless network to communicate data to and from other wireless devices.

SUMMARY

In an embodiment, a wireless communication device may comprise a first processor; a first memory, wherein the first processor and the first memory are configured to receive monitored data from one or more sensors, and wirelessly communicate the received monitored data; and a modem comprising a second processor and a second memory, wherein the second processor is configured to wirelessly send an identifier for the current firmware stored in the second memory; when a firmware upgrade is available, receive an upgrade for the firmware stored in the second memory; upgrade the firmware stored in the second memory, wherein upgrading the firmware comprises temporarily interrupting wireless communication to and from the wireless communication device; reestablish wireless communication to and from the wireless communication device; and forward any monitored data received by the first processor and the first memory during the temporary interruption.

In an embodiment, a method for upgrading the firmware of a wireless communication device may comprise sending a wireless communication containing an identifier for the current firmware stored in a memory of a modem on the wireless communication device; when a firmware upgrade is available, receiving an upgrade for the firmware stored in the memory; upgrading the firmware stored in the memory, wherein upgrading the firmware comprises temporarily interrupting wireless communication to and from the wireless communication device; reestablishing wireless communication to and from the wireless communication device; and forwarding any monitored data received by the wireless communication device during the temporary interruption.

In an embodiment, a wireless communication system may comprise a remote server configured to wirelessly communicate with a plurality of devices; at least one wireless communication device comprising a first processor; a first memory, wherein the first processor and the first memory are configured to receive monitored data from one or more sensors, and wirelessly communicate the received monitored data to the remote server; and a modem comprising a second processor and a second memory, wherein the second processor is configured to wirelessly send an identifier for the current firmware stored in the second memory to the remote server; when a firmware upgrade is identified by the remote server, receive an upgrade for the firmware stored in the second memory from the remote server; upgrade the firmware stored in the second memory, wherein upgrading the firmware comprises temporarily interrupting wireless communication to and from the wireless communication device; reestablish wireless communication to and from the wireless communication device; and forward any monitored data received by the first processor and the first memory during the temporary interruption to the remote server.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
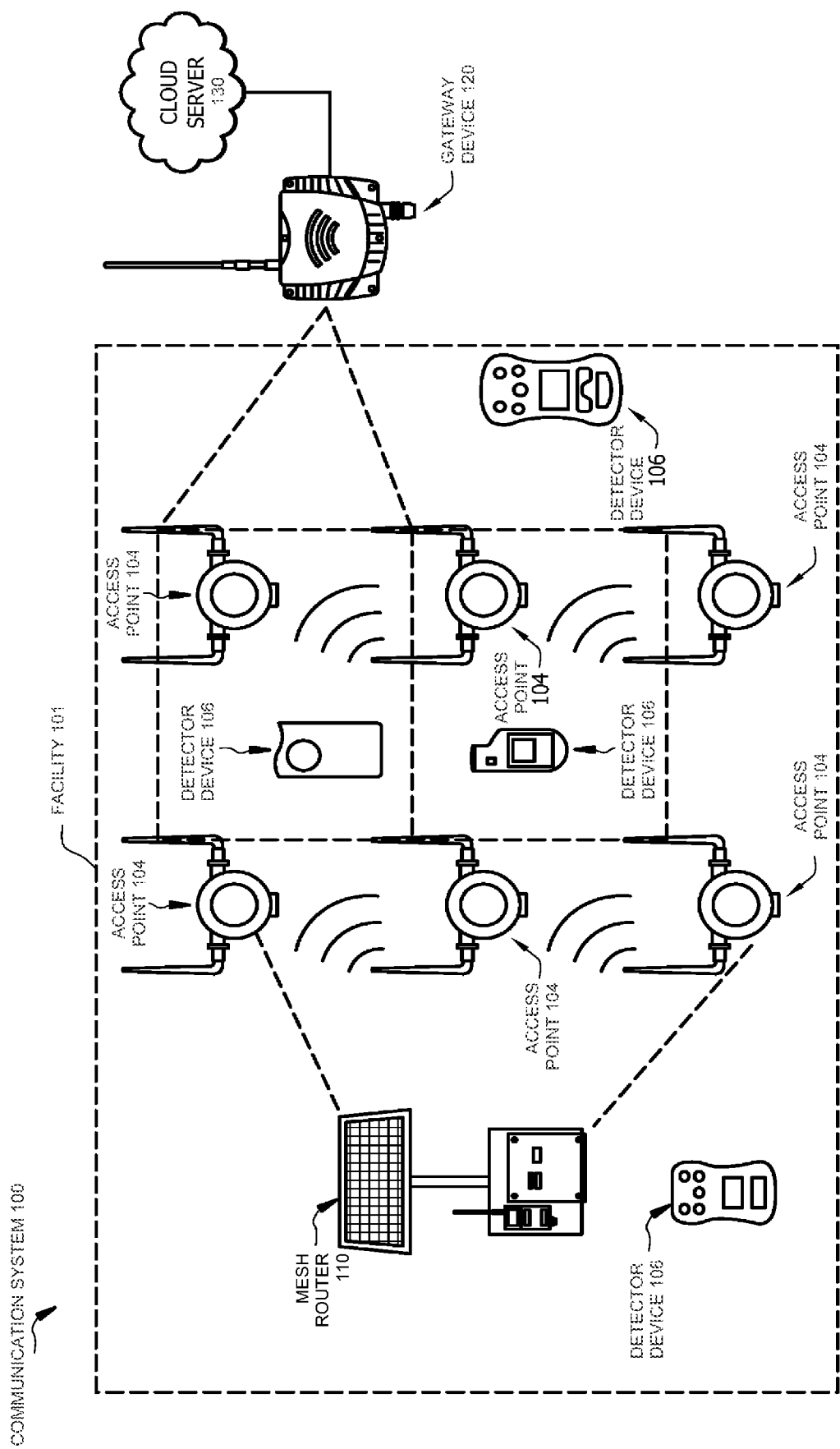
FIG. 1 illustrates a wireless communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include systems and method for upgrading modem firmware over-the-air without interrupting sensor/detector communication.

Mesh modems may typically be installed into instruments by welding the modem onto a main board or by plugging onto the main board via a socket. Because of the typical installation and location of modems, updating the modem firmware may require time consuming processes. In some cases, mesh modem firmware is updated using one or more devices, where it may be required to open the instrument unit, remove the mesh modem, and place the mesh modem on a special evaluation board to upgrade the firmware.

Using a method for upgrading the modem firmware over-the-air may allow for upgrades to occur without needing to remove the mesh modem, or otherwise interfere with the instrument. One of the challenges faced when upgrading the modem firmware includes the desire to limit the amount of time that the instrument is taken off-line during the upgrade process. During the time that the modem is off-line, any sensor readings or alarms may not be able to be communicated back to a control system to initiate emergency procedures.

When an instrument and router are connected to a cloud server, the end device(s) (such as gas detectors) and router(s) may communicate with the cloud server, sending real time monitor (or sensor) data and status to the cloud server. Additionally, the devices(s) may communicate configuration information which includes modem firmware version information to the cloud server. The cloud server may store an updated modem firmware, and may check the modem firmware version included in the communication from the devices(s). The cloud server may be configured to determine whether the firmware needs to be upgraded for the end device modem and/or router modem. If the firmware version doesn't match the latest firmware version, the cloud server can require an update for the end device and/or router modem firmware in sequence, and all the updating can be done automatically.

In some embodiments, the mesh modem board may comprise flash storage which is used to store a firmware image and control file. After the mesh modem receives complete and correct files from the cloud server, the modem may inform the host instrument and send a leave network message to the cloud server, then start to upgrade its firmware itself. After successfully upgrading the firmware, the modem may restart automatically and inform the host instrument that it is ready to rejoin to network. By downloading and verifying the upgrade prior to starting the upgrade, the amount of time needed to upgrade the firmware may be reduced or minimized compared to other methods.

Referring now to FIG. 1, a communication system 100 is shown. The communication system 100 may comprise a gateway device 120 operable to receive information from a plurality of devices. The gateway device 120 may also be in communication with a cloud server 130. In some embodiments, the communication system 100 may comprise a plurality of access points 104 (which may also be known as routers, though other devices can also be used), which may be located throughout a facility 101 where gas detection (or other sensor detection) may be necessary. In some embodiments, the access points 104 may be in fixed locations within the facility 101. In some embodiments, the access points 104 may communicate wirelessly with other devices within the facility 101, and the access points 104 may communicate with other access points though the wireless mesh network within the facility 101. In some embodiments, the access points 104 may communicate over a wired connection with other devices within the facility 101. In some embodiments, each of the access points 104 may comprise a modem.

In some embodiments, the communication system 100 may comprise one or more detector devices 106 located within the facility 101. The detector devices 106 may comprise gas detector devices operable to detect concentrations of one or more gases in the air. These detector devices 106 may be mobile and carried with a worker in the facility. In some embodiments, the gas detector devices 106 may be operable to trigger alarms when the detected gas concentration moves outside of a predetermined threshold or thresholds.

In some embodiments, the gateway device 120 may receive the data from the detector device 106 and may analyze and/or process the data. For example, the gateway device 120 may use the location information to perform a triangulation algorithm to determine the actual location(s) of the detector device 106 within the facility 101. In this embodiment, the data may not be processed or analyzed locally by the detector device 106, but may instead be communicated to the gateway device 120 for analysis. In some embodiments, each of the detector devices 106 may comprise a modem. The communication system 100 may also comprise a mesh router 110 configured to provide wireless communication support for the communication system 100.

Figure 2:
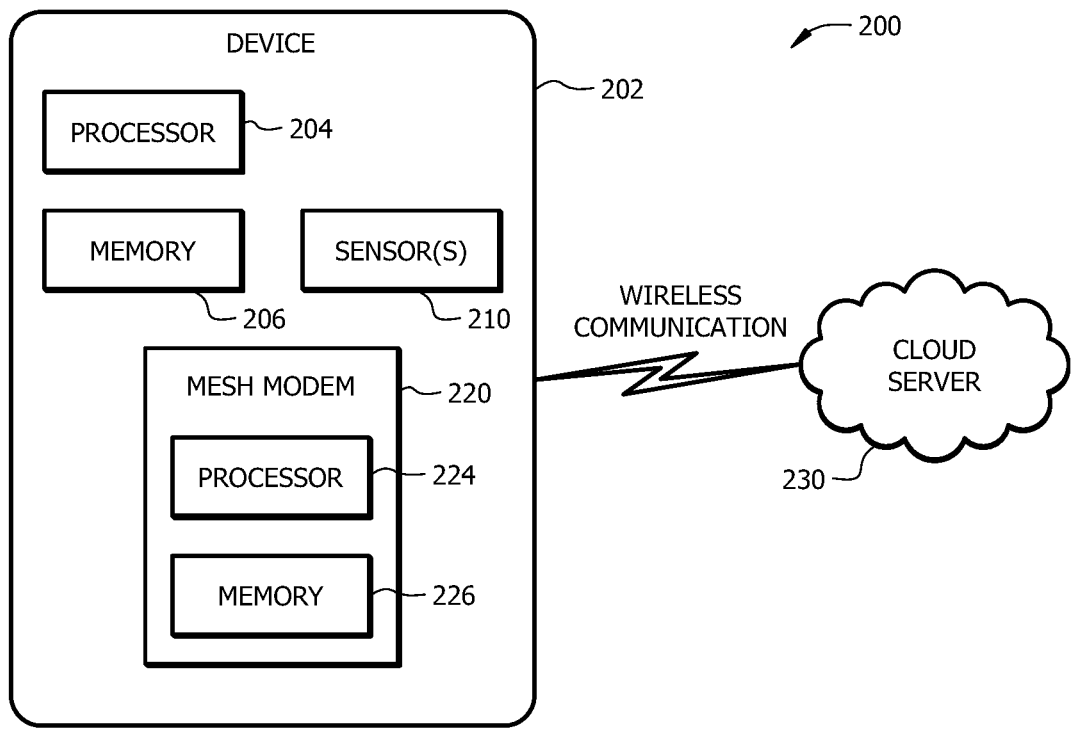
FIG. 2 illustrates a wireless communication device and system according to an embodiment of the disclosure.

Referring to FIG. 2, a communication system 200 is shown, where the communication system 200 may be similar to the communication system 100 described above. The communication system 200 may comprise a communication device 202, where the communication device 202 may comprise a router, an access point, detector device, and/or another similar communication device 202 that may participate in a wireless communication network. The communication device 202 may comprise a processor 204 and a memory 206 configured to complete processes on the communication device 202 and control the communication to and from the device. In some embodiments, the communication device 202 may comprise one or more sensors 210, wherein the sensors 210 may be configured to detect one or more environmental elements (such as gas content, temperature, pressure, humidity, motion, etc.).

In some embodiments, the communication device 202 may comprise a mesh modem 220 configured to facilitate wireless communication to and from the communication device 202. The mesh modem 220 may comprise a processor 224 and memory 226, which may be separate from the processor 204 and memory 206 of the communication device 202. The mesh modem 220 may be configured to provide wireless communication using any number of wireless protocols, such as radio, cellular, Wi-Fi, Bluetooth, etc.

In some embodiments, the communication device 202 may wirelessly communicate with a cloud server 230. For example, the data collected by the sensors 210 may be communicated to the cloud server 230 to be stored and/or processed. In some embodiments, when the communication device 202 sends data to the cloud server 230, the data may include information about the current settings and processes on the communication device 202. For example, the current firmware that is installed on the mesh modem 220 may be communicated to the cloud server 230. The cloud server 230 may process this information and may identify if the firmware of the mesh modem 220 can be upgraded. When the cloud server 230 determines that the firmware can be upgraded, the cloud server 230 may send the upgrade to the communication device 202, where the mesh modem 220 may install the upgraded firmware. The installation may be facilitated by the processor 224 and memory 226 of the mesh modem 220, and may not affect the processor 204 and memory 206 of the communication device 202. Therefore, the communication device 202 may continue to function while the firmware upgrade is happening. In some embodiments, the wireless connection between the communication device 202 and other devices may be temporarily interrupted while the upgrade is happening, and once the wireless connection is reestablished, any information that was collected by the communication device 202 during the interruption may be then forwarded to the cloud server 230 and/or another device.

Figure 3:
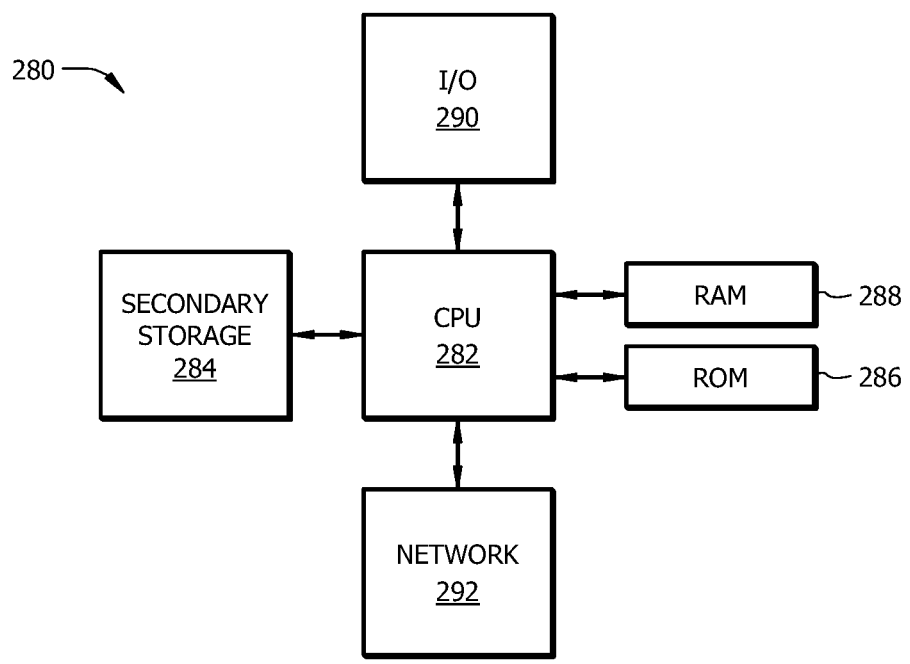
FIG. 3 illustrates a computer that can be used to carry out various steps according to an embodiment of the disclosure.

FIG. 3 illustrates a computer system 280 suitable for implementing one or more embodiments disclosed herein such as the acquisition device or any portion thereof. The computer system 280 includes a processor 282 (which may be referred to as a central processor unit or CPU) that is in communication with memory devices including secondary storage 284, read only memory (ROM) 286, random access memory (RAM) 288, input/output (I/O) devices 290, and network connectivity devices 292. The processor 282 may be implemented as one or more CPU chips.

It is understood that by programming and/or loading executable instructions onto the computer system 280, at least one of the CPU 282, the RAM 288, and the ROM 286 are changed, transforming the computer system 280 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the computer system 280 is turned on or booted, the CPU 282 may execute a computer program or application. For example, the CPU 282 may execute software or firmware stored in the ROM 286 or stored in the RANI 288. In some cases, on boot and/or when the application is initiated, the CPU 282 may copy the application or portions of the application from the secondary storage 284 to the RANI 288 or to memory space within the CPU 282 itself, and the CPU 282 may then execute instructions that the application is comprised of. In some cases, the CPU 282 may copy the application or portions of the application from memory accessed via the network connectivity devices 292 or via the I/O devices 290 to the RAM 288 or to memory space within the CPU 282, and the CPU 282 may then execute instructions that the application is comprised of. During execution, an application may load instructions into the CPU 282, for example load some of the instructions of the application into a cache of the CPU 282. In some contexts, an application that is executed may be said to configure the CPU 282 to do something, e.g., to configure the CPU 282 to perform the function or functions promoted by the subject application. When the CPU 282 is configured in this way by the application, the CPU 282 becomes a specific purpose computer or a specific purpose machine.

The secondary storage 284 is typically comprised of one or more disk drives or tape drives and is used for non-volatile storage of data and as an over-flow data storage device if RANI 288 is not large enough to hold all working data. Secondary storage 284 may be used to store programs which are loaded into RANI 288 when such programs are selected for execution. The ROM 286 is used to store instructions and perhaps data which is read during program execution. ROM 286 is a non-volatile memory device which typically has a small memory capacity relative to the larger memory capacity of secondary storage 284. The RANI 288 is used to store volatile data and perhaps to store instructions. Access to both ROM 286 and RANI 288 is typically faster than access to secondary storage 284. The secondary storage 284, the RANI 288, and/or the ROM 286 may be referred to in some contexts as computer readable storage media and/or non-transitory computer readable media.

I/O devices 290 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 292 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 292 may enable the CPU 282 to communicate with the Internet or one or more intranets. With such a network connection, it is contemplated that the CPU 282 might receive information from the network, or might output information to the network (e.g., to an event database) in the course of performing the above-described method steps. Such information, which is often represented as a sequence of instructions to be executed using CPU 282, may be received from and outputted to the network, for example, in the form of a computer data signal embodied in a carrier wave.

Such information, which may include data or instructions to be executed using CPU 282 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The CPU 282 executes instructions, codes, computer programs, scripts which it accesses from hard disk, floppy disk, optical disk (these various disk based systems may all be considered secondary storage 284), flash drive, ROM 286, RANI 288, or the network connectivity devices 292. While only one CPU 282 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 284, for example, hard drives, floppy disks, optical disks, and/or other devices, the ROM 286, and/or the RANI 288 may be referred to in some contexts as non-transitory instructions and/or non-transitory information.

In an embodiment, the computer system 280 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 280 to provide the functionality of a number of servers that is not directly bound to the number of computers in the computer system 280. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 280, at least portions of the contents of the computer program product to the secondary storage 284, to the ROM 286, to the RANI 288, and/or to other non-volatile memory and volatile memory of the computer system 280. The CPU 282 may process the executable instructions and/or data structures in part by directly accessing the computer program product, for example by reading from a CD-ROM disk inserted into a disk drive peripheral of the computer system 280. Alternatively, the CPU 282 may process the executable instructions and/or data structures by remotely accessing the computer program product, for example by downloading the executable instructions and/or data structures from a remote server through the network connectivity devices 292. The computer program product may comprise instructions that promote the loading and/or copying of data, data structures, files, and/or executable instructions to the secondary storage 284, to the ROM 286, to the RANI 288, and/or to other non-volatile memory and volatile memory of the computer system 280.

In some contexts, the secondary storage 284, the ROM 286, and the RAM 288 may be referred to as a non-transitory computer readable medium or a computer readable storage media. A dynamic RAM embodiment of the RAM 288, likewise, may be referred to as a non-transitory computer readable medium in that while the dynamic RANI receives electrical power and is operated in accordance with its design, for example during a period of time during which the computer system 280 is turned on and operational, the dynamic RANI stores information that is written to it. Similarly, the CPU 282 may comprise an internal RAM, an internal ROM, a cache memory, and/or other internal non-transitory storage blocks, sections, or components that may be referred to in some contexts as non-transitory computer readable media or computer readable storage media.

In a first embodiment, a wireless communication device may comprise a first processor; a first memory, wherein the first processor and the first memory are configured to receive monitored data from one or more sensors, and wirelessly communicate the received monitored data; and a modem comprising a second processor and a second memory, wherein the second processor is configured to wirelessly send an identifier for the current firmware stored in the second memory; when a firmware upgrade is available, receive an upgrade for the firmware stored in the second memory; upgrade the firmware stored in the second memory, wherein upgrading the firmware comprises temporarily interrupting wireless communication to and from the wireless communication device; reestablish wireless communication to and from the wireless communication device; and forward any monitored data received by the first processor and the first memory during the temporary interruption.

A second embodiment can include the device of the first embodiment, wherein the wireless communication device continues to receive monitored data from the one or more sensors during the temporary interruption in wireless communication.

A third embodiment can include the device of the first or second embodiments, wherein the wireless communication device comprises a gas detector.

A fourth embodiment can include the device of any of the first to third embodiments, further comprising the one or more sensors located within the wireless communication device.

A fifth embodiment can include the device of any of the first to fourth embodiments, wherein the wireless communication device comprises a router, and wherein the sensors are located within a gas detector configured to wirelessly communicate with the router.

A sixth embodiment can include the device of any of the first to fifth embodiments, wherein the identifier for the current firmware comprises a firmware image file.

A seventh embodiment can include the device of the sixth embodiment, wherein the second processor is further configured to store an updated firmware image file associated with the upgraded firmware.

An eighth embodiment can include the device of any of the first to seventh embodiments, wherein the device is configured to wirelessly communicate the received monitored data to a remote server.

A ninth embodiment can include the device of any of the first to eighth embodiments, wherein the device is configured to wirelessly send the identifier for the current firmware to the remote server, and wherein the device is configured to receive the upgrade for the firmware from the remote server, when a firmware upgrade is identified by the remote server.

In a tenth embodiment, a method for upgrading the firmware of a wireless communication device may comprise sending a wireless communication containing an identifier for the current firmware stored in a memory of a modem on the wireless communication device; when a firmware upgrade is available, receiving an upgrade for the firmware stored in the memory; upgrading the firmware stored in the memory, wherein upgrading the firmware comprises temporarily interrupting wireless communication to and from the wireless communication device; reestablishing wireless communication to and from the wireless communication device; and forwarding any monitored data received by the wireless communication device during the temporary interruption.

An eleventh embodiment can include the method the tenth embodiment, further comprising receiving monitored data from one or more sensors, and wirelessly communicating the received monitored data.

A twelfth embodiment can include the method of the tenth or eleventh embodiments, further comprising continuing to receive monitored data from the one or more sensors during the temporary interruption in wireless communication.

A thirteenth embodiment can include the method of any of the tenth to twelfth embodiments, wherein the wireless communication device comprises a gas detector.

A fourteenth embodiment can include the method of any of the tenth to thirteenth embodiments, wherein the wireless communication device comprises a router, and wherein the sensors are located within a gas detector configured to wirelessly communicate with the router.

A fifteenth embodiment can include the method of the any of the tenth to fourteenth embodiments, wherein the identifier for the current firmware comprises a firmware image file, and wherein the method further comprises storing an updated firmware image file associated with the upgraded firmware.

In a sixteenth embodiment, a wireless communication system may comprise a remote server configured to wireless communication with a plurality of devices; at least one wireless communication device comprising a first processor; a first memory, wherein the first processor and the first memory are configured to receive monitored data from one or more sensors, and wirelessly communicate the received monitored data to the remote server; and a modem comprising a second processor and a second memory, wherein the second processor is configured to wirelessly send an identifier for the current firmware stored in the second memory to the remote server; when a firmware upgrade is identified by the remote server, receive an upgrade for the firmware stored in the second memory from the remote server; upgrade the firmware stored in the second memory, wherein upgrading the firmware comprises temporarily interrupting wireless communication to and from the wireless communication device; reestablish wireless communication to and from the wireless communication device; and forward any monitored data received by the first processor and the first memory during the temporary interruption to the remote server.

A seventeenth embodiment can include the system of the sixteenth embodiment, wherein the remote server comprises a cloud server.

An eighteenth embodiment can include the system of any of the sixteenth or seventeenth embodiments, wherein the wireless communication device continues to receive monitored data from the one or more sensors during the temporary interruption in wireless communication.

A nineteenth embodiment can include the system of any of the sixteenth to eighteenth embodiments, wherein the wireless communication device comprises a gas detector.

A twentieth embodiment can include the system of any of the sixteenth to nineteenth embodiments, wherein the wireless communication device further comprises the one or more sensors located within the wireless communication device.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A wireless communication device comprising:
   a first processor;
   a first memory, wherein the first processor and the first memory are configured to receive monitored data from one or more sensors, and wirelessly communicate the received monitored data; and
   a modem comprising a second processor and a second memory, wherein the second processor is configured to:
   wirelessly send an identifier for a current firmware stored in the second memory, wherein the identifier for the current firmware comprises a firmware image file;
   when a firmware upgrade is available, receive an upgrade for the current firmware stored in the second memory;
   upgrade the current firmware stored in the second memory, wherein said upgrading the current firmware comprises temporarily interrupting wireless communication to and from the wireless communication device;
   store an updated firmware image file associated with the upgraded current firmware;
   reestablish the wireless communication to and from the wireless communication device; and
   forward any monitored data received by the first processor and the first memory during the temporary interruption,
   wherein the wireless communication device is configured to wirelessly send the identifier for the current firmware to a remote server, and wherein the wireless communication device is configured to receive the upgrade for the current firmware from the remote server, when the firmware upgrade is identified by the remote server, wherein the wireless communication device comprises a gas detector that is operable to trigger an alarm when a detected gas concentration moves outside of a predetermined threshold, wherein the wireless communication device continues to receive the monitored data from the one or more sensors during the temporary interruption in the wireless communication to and from the wireless communication device.

2. The wireless communication device of claim 1 further comprising the one or more sensors located within the wireless communication device.

3. The wireless communication device of claim 1, wherein the wireless communication device comprises a router, and wherein the one or more sensors are located within the gas detector configured to wirelessly communicate with the router.

4. The wireless communication device of claim 1, wherein the wireless communication device is configured to wirelessly communicate the received monitored data to the remote server.

5. A method for an upgrade of a current firmware of a wireless communication device, the method comprising:
   sending a wireless communication to and from the wireless communication device containing an identifier for the current firmware stored in a memory of a modem on the wireless communication device, wherein the identifier for the current firmware comprises a firmware image file, wherein the wireless communication device comprises a gas detector that is operable to trigger an alarm when a detected gas concentration moves outside of a predetermined threshold;
   when a firmware upgrade is available, receiving the upgrade for the current firmware stored in the memory;
   said upgrading the current firmware stored in the memory, wherein said upgrading the current firmware comprises temporarily interrupting the wireless communication to and from the wireless communication device;
   continuing to receive monitored data from one or more sensors during the temporary interruption in the wireless communication to and from the wireless communication device;
   storing an updated firmware image file associated with the upgraded current firmware;
   reestablishing the wireless communication to and from the wireless communication device; and
   forwarding any monitored data received by the wireless communication device during the temporary interruption,
   wherein the wireless communication device is configured to wirelessly send the identifier for the current firmware to a remote server, and wherein the wireless communication device is configured to receive the upgrade for the current firmware from the remote server, when the firmware upgrade is identified by the remote server.

6. The method of claim 5 further comprising wirelessly communicating the received monitored data.

7. The method of claim 5, wherein the wireless communication device comprises a router, and wherein the one or more sensors are located within the gas detector configured to wirelessly communicate with the router.

* * * * *